United States Patent
Kishore et al.

(10) Patent No.: US 9,541,415 B2
(45) Date of Patent: Jan. 10, 2017

(54) NAVIGATION SYSTEM WITH TOUCHLESS COMMAND MECHANISM AND METHOD OF OPERATION THEREOF

(71) Applicant: Telenav, Inc., Sunnyvale, CA (US)

(72) Inventors: Sumit Kishore, San Jose, CA (US); Ziwei Zeng, Santa Clara, CA (US); Philip Sovi, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 109 days.

(21) Appl. No.: 14/472,080

(22) Filed: Aug. 28, 2014

(65) Prior Publication Data

US 2016/0061619 A1    Mar. 3, 2016

(51) Int. Cl.
*G01C 21/00* (2006.01)
*G01C 21/36* (2006.01)
*G06F 3/01* (2006.01)

(52) U.S. Cl.
CPC ....... *G01C 21/3602* (2013.01); *G01C 21/3664* (2013.01); *G06F 3/011* (2013.01); *G06F 3/017* (2013.01)

(58) Field of Classification Search
None
See application file for complete search history.

(56) References Cited

U.S. PATENT DOCUMENTS

| | | | |
|---|---|---|---|
| 7,372,977 B2 | 5/2008 | Fujimura et al. | |
| 8,448,056 B2 | 5/2013 | Pulsipher et al. | |
| 2013/0141327 A1* | 6/2013 | Wei | G06F 3/011 345/156 |
| 2015/0103003 A1* | 4/2015 | Kerr | G06F 3/013 345/158 |

* cited by examiner

*Primary Examiner* — Adam Alharbi
(74) *Attorney, Agent, or Firm* — IP Investment Law Group

(57) ABSTRACT

A navigation system includes: an image capture unit, configured to capture a gesture; a control unit, coupled to the image capture unit, configured to distinguish between a command motion and a natural motion based on the gesture, an auditory cue, and a contextual information; and generate a command combination for instructing the navigation system based on the command motion and the auditory cue.

20 Claims, 6 Drawing Sheets

NAVIGATION SYSTEM WITH TOUCHLESS COMMAND MECHANISM AND METHOD OF OPERATION THEREOF

TECHNICAL FIELD

The present invention relates generally to a navigation system, and more particularly to a navigation system with a touchless command mechanism.

BACKGROUND

Modern portable consumer and industrial electronics, especially client devices such as navigation systems, mobile phones, tablet computers, and combination devices, are providing increasing levels of functionality to support modern life including location-based services. Research and development in the existing technologies can take myriad directions.

As users become more empowered with the growth of portable location-based service devices, new and old paradigms begin to take advantage of this new device space. However, users often have difficulty operating such devices during requisite times.

Thus, a need still remains for a navigation system with a touchless command mechanism appropriate for today's devices. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a navigation system, including: an image capture unit, configured to capture a gesture; a control unit, coupled to the image capture unit, configured to distinguish between a command motion and a natural motion based on the gesture, an auditory cue, and a contextual information; and generate a command combination for instructing the navigation system based on the command motion and the auditory cue.

An embodiment of the present invention provides a method of operation of a navigation system including: capturing, with an image capture unit, a gesture; distinguishing, with a control unit coupled to the image capture unit, between a command motion and a natural motion based on the gesture, an auditory cue, and a contextual information; and generating a command combination for instructing the navigation system based on the command motion and the auditory cue.

An embodiment of the present invention provides instructions for execution by a control unit, the medium comprising: capturing a gesture; distinguishing between a command motion and a natural motion based on the gesture, an auditory cue, and a contextual information; and generating a command combination for instructing the navigation system based on the command motion and the auditory cue.

Certain embodiments of the invention have other steps or elements in addition to or in place of those mentioned above. The steps or element will become apparent to those skilled in the art from a reading of the following detailed description when taken with reference to the accompanying drawings.

DETAILED DESCRIPTION

Figure 1:
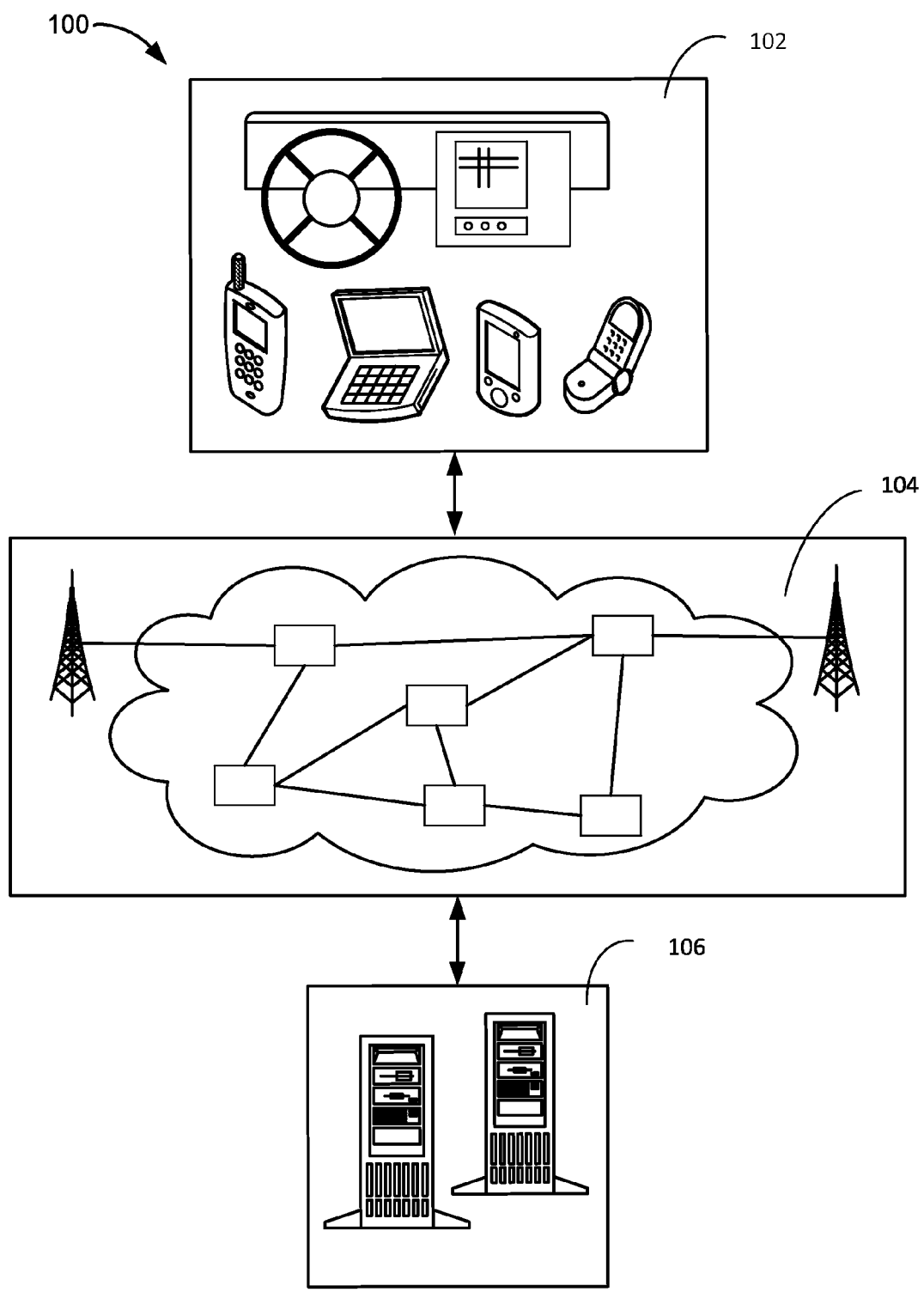
FIG. 1 is a navigation system with a touchless command mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with a touchless command mechanism in an embodiment of the present invention. The navigation system 100 includes a first device 102, such as a client or a server, connected to a second device 106, such as a client or server, with a communication path 104, such as a wireless or wired network.

For example, the first device 102 can be any of a variety of mobile devices, such as a cellular phone, a tablet device, a smartphone, a wearable device, a personal digital assistant, a notebook computer, an automotive telematic navigation system, or other multi-functional mobile communication or entertainment device. The first device 102 can couple to the communication path 104 to communicate with the second device 106.

For illustrative purposes, the navigation system 100 is described with the first device 102 as a computing device, although it is understood that the first device 102 can be different types of computing devices. For example, the first device 102 can also be a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, a rack mounted server, or a blade server, or as more specific examples, an IBM System z10™ Business Class mainframe or a HP ProLiant ML™ server. For illustrative purposes, the navigation system 100 is described with the second device 106 as a non-mobile computing device, although it is understood that the second device 106 can be different types of computing devices.

For example, the second device 106 can also be a mobile computing device, such as a notebook computer, a wearable device, a thin client device, a netbook, a smartphone, a personal digital assistant, a cellular phone, and as specific examples, an Apple iPhone™, a Samsung Galaxy™, a Microsoft Windows Phone™, an HTC One™, or a Motorola Moto™. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or a combination thereof. Satellite communication, cellular communication, Bluetooth, Infrared Data Association standard (IrDA), wireless fidelity (WiFi), and worldwide interoperability for microwave access (Wi-MAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
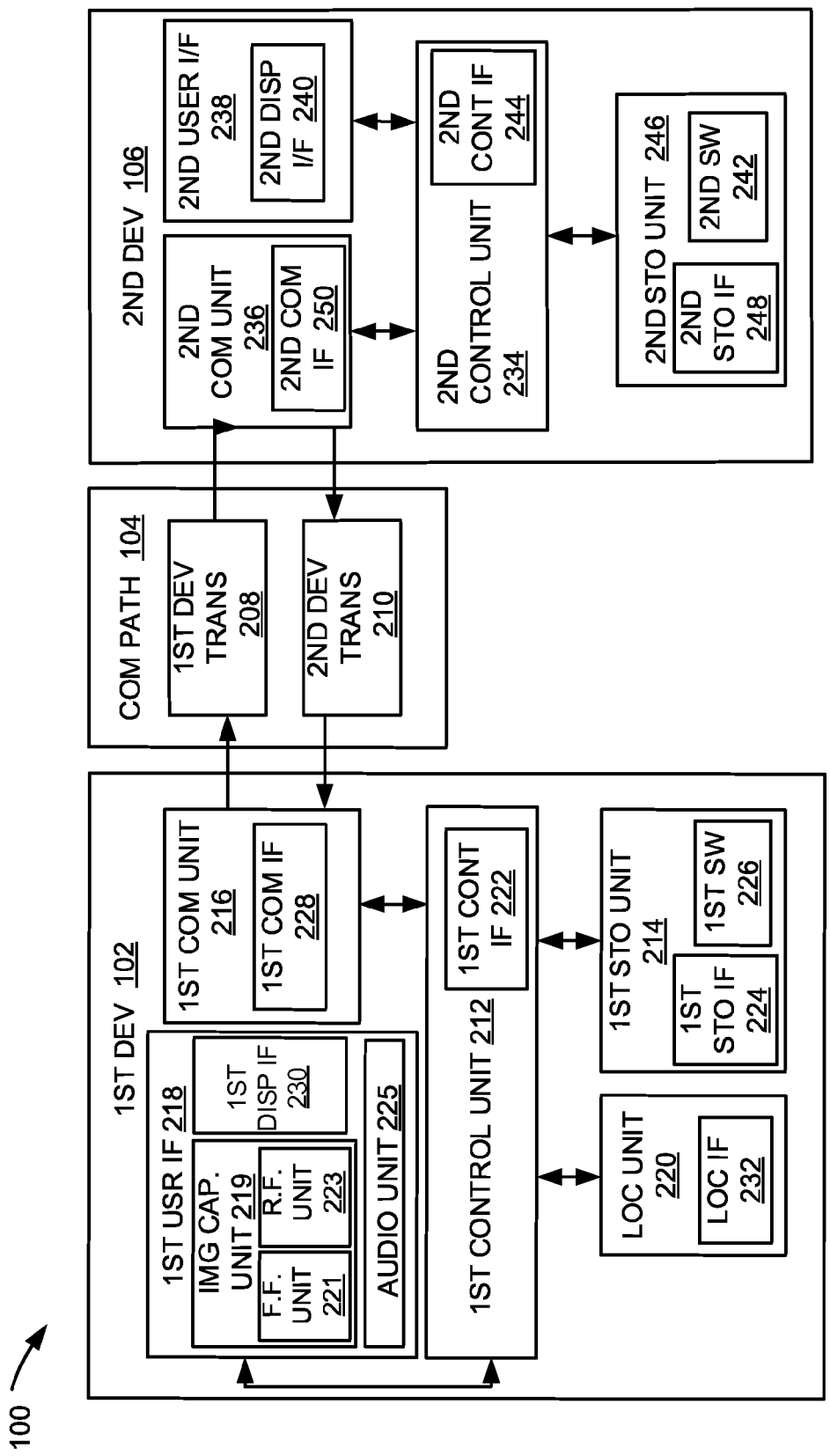
FIG. 2 is an exemplary block diagram of the navigation system.

Referring now to FIG. 2 therein is shown an exemplary block diagram of the navigation system 100. The navigation system 100 can include the first device 102, the communication path 104, and the second device 106. The first device 102 can send information in a first device transmission 208 over the communication path 104 to the second device 106. The second device 106 can send information in a second device transmission 210 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 212, a first storage unit 214, a first communication unit 216, a first user interface 218, and a location unit 220. The first device 102 can be similarly described by the first device 102.

The first control unit 212 can include a first control interface 222. The first control unit 212 can execute a first software 226 to provide the intelligence of the navigation system 100. The first control unit 212 can be implemented in a number of different manners. For example, the first control unit 212 can be a processor, an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The location unit 220 can generate a location information, a current heading, and a current speed of the first device 102, as examples. The location unit 220 can be implemented in many ways. For example, the location unit 220 can function as at least a part of a global positioning system (GPS), an inertial navigation system such as a gyroscope, an accelerometer, or a combination thereof, a cellular-tower location system, a pressure location system, or any combination thereof.

The location unit 220 can include a location interface 232. The location interface 232 can be used for communication between the location unit 220 and other functional units in the first device 102. The location interface 232 can also be used for communication that is external to the first device 102.

The location interface 232 can receive information from the other functional units or from external sources, or can transmit information to the other functional units or to external destinations. The external sources and the external destinations refer to sources and destinations external to the first device 102.

The location interface 232 can include different implementations depending on which functional units or external units are being interfaced with the location unit 220. The location interface 232 can be implemented with technologies and techniques similar to the implementation of the first control interface 222.

The first storage unit 214 can store the first software 226. The first storage unit 214 can also store the relevant information, such as advertisements, point of interest (POI), navigation routing entries, reviews/ratings, feedback, traffic patterns, or any combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between the location unit 220 and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106 of FIG. 1, an attachment, such as a peripheral device or a computer desktop, and the communication path 104.

The first communication unit 216 can also function as a communication hub allowing the first device 102 to function as part of the communication path 104 and not limited to be an end point or terminal unit to the communication path 104. The first communication unit 216 can include active and passive components, such as microelectronics or an antenna, for interaction with the communication path 104.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, an image capture unit 219, an audio unit 225, or any combination thereof to provide data and communication inputs.

The image capture unit 219 can capture static images, video, light reflectance, IR signatures, UV signatures, or a combination thereof. The image capture unit 219 can be implemented in many ways. For example, the image capture unit 219 can be implemented as one or more two-dimensional cameras, three-dimensional cameras, optical sensors, low-light cameras, infrared (IR) sensors, ultraviolet (UV) sensors, thermal imaging cameras, or a combination thereof. In addition, the image capture unit 219 can include a light-emitting diode component, a radio frequency (RF) sensor, an electric field sensor, or a combination thereof.

Also, for illustrative purposes, the image capture unit 219 is shown as being embedded in the first device 102. However, it is understand that the image capture unit 219 can operate on the periphery or outside of the first device 102. For example, the image capture unit 219 can be a three-dimensional camera coupled to the first device 102.

The audio unit 225 can capture acoustic signals and convert such signals to an electrical signal. The audio unit 225 can be implemented as an acoustic-to-electric transducer or sensor including a dynamic microphone, a condenser microphone, a piezoelectric microphone, or a combination thereof. For illustrative purposes, the audio unit 225 is shown being embedded in the first device 102. However, it is understand that the audio unit 225 can operate on the periphery or outside of the first device 102.

The first user interface 218 can include a first display interface 230. The first display interface 230 can include a display, a projector, a video screen, a speaker, or any combination thereof.

The first control unit 212 can operate the first user interface 218 to display information generated by the navigation system 100. The first control unit 212 can also execute the first software 226 for the other functions of the navigation system 100, including receiving location information from the location unit 220. The first control unit 212 can further execute the first software 226 for interaction with the communication path 104 via the first communication unit 216.

The image capture unit 219 can include a front-facing unit 221, a rear-facing unit 223, or a combination thereof. The front-facing unit 221 is a portion of the image capture unit 219 having a lens or light capture component on substantially the same side as the first display interface 230. The rear-facing unit 223 is a portion of the image capture unit 219 having a lens on the opposite side as the first display interface 230. The front-facing unit 221 and the rear-facing unit 223 can work simultaneously to capture images on both sides of the first device 102.

The second device 106 can be optimized for implementing the various embodiments in a multiple device embodiment with the first device 102. The second device 106 can provide the additional or higher performance processing power compared to the first device 102. The second device 106 can include a second control unit 234, a second communication unit 236, and a second user interface 238.

The second user interface 238 allows the user to interface and interact with the second device 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second device 106 of the navigation system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the navigation system 100, including operating the second communication unit 236 to communicate with the first device 102 over the communication path 104.

The second control unit 234 can be implemented in a number of different manners. For example, the second control unit 234 can be a processor, an embedded processor, a microprocessor, a hardware control logic, a hardware finite state machine (FSM), a digital signal processor (DSP), or a combination thereof.

The second control unit 234 can include a second controller interface 244. The second controller interface 244 can be used for communication between the second control unit 234 and other functional units in the second device 106. The second controller interface 244 can also be used for communication that is external to the second device 106.

The second controller interface 244 can receive information from the other functional units or from external sources, or can transmit information to the other functional units or to external destinations. The external sources and the external destinations refer to sources and destinations external to the second device 106.

The second controller interface 244 can be implemented in different ways and can include different implementations depending on which functional units or external units are being interfaced with the second controller interface 244. For example, the second controller interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the relevant information, such as advertisements, points of interest, navigation routing entries, reviews/ratings, feedback, traffic patterns, or any combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the navigation system 100 is shown with the second storage unit 246 as a single hierarchy storage system, although it is understood that the navigation system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between the location unit 220 and other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second controller interface 244.

The second communication unit 236 can enable external communication to and from the second device 106. For example, the second communication unit 236 can permit the second device 106 to communicate with the first device 102 over the communication path 104.

The second communication unit 236 can also function as a communication hub allowing the second device 106 to function as part of the communication path 104 and not limited to be an end point or terminal unit to the communication path 104. The second communication unit 236 can include active and passive components, such as microelectronics or an antenna, for interaction with the communication path 104.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second controller interface 244.

The first communication unit 216 can couple with the communication path 104 to send information to the second device 106 in the first device transmission 208. The second device 106 can receive information in the second communication unit 236 from the first device transmission 208 of the communication path 104.

The second communication unit 236 can couple with the communication path 104 to send information to the first device 102 in the second device transmission 210. The first device 102 can receive information in the first communication unit 216 from the second device transmission 210 of the communication path 104. The navigation system 100 can be executed by the first control unit 212, the second control unit 234, or a combination thereof.

For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 220, although it is understood that the second device 106 can also operate the location unit 220.

Figure 3:
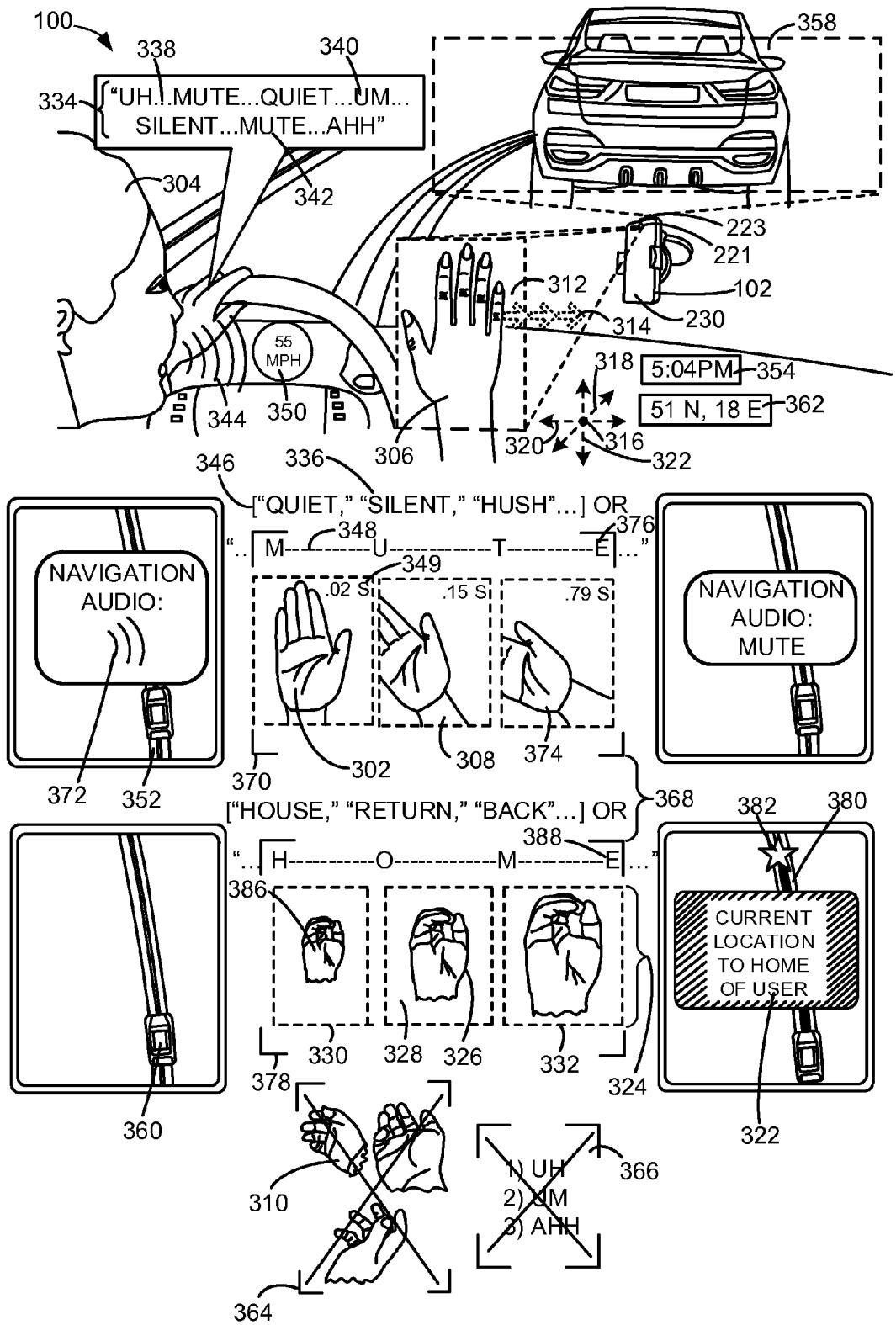
FIG. 3 is an example diagram of the navigation system in operation.

Referring now to FIG. 3 therein is shown an example diagram of the navigation system 100 in operation. FIG. 3 depicts a gesture 302 of a user 304. The gesture 302 is a representation of a bodily movement of the user 304. The gesture 302 can include a representation of a movement carried out by an appendage 306 of the user 304 such as a finger, a hand, an arm, a foot, a leg, or a combination thereof.

The gesture 302 can include a command motion 308 and a natural motion 310. The command motion 308 is a representation of a bodily movement of the user 304 for instructing the navigation system 100. The command motion 308 can include a gesticulation of the user 304 for initiating an action, a task, or a combination thereof by the navigation system 100 or affecting a change in a state of the navigation system 100.

The natural motion 310 is a representation of a bodily movement of the user 304 not intended for instructing or commanding the navigation system 100. For example, the natural motion 310 can include bodily movements commonly accepted or recognized for communicating emotions or sentiments between people. In this example, the natural motion 310 can include a hand waving motion for acknowledging a departure of an acquaintance of the user 304. As an additional example, the natural motion 310 can include bodily movements in connection with carrying out a manual task. As a more specific example, the natural motion 310 can include a steering motion made by a hand of the user 304 for operating a vehicle.

FIG. 3 also depicts the gesture 302 being captured in a field-of-view 312. The field-of-view 312 is a region of space representing an observable area by an optical instrument or sensor. The field-of-view 312 can be the region of space representing the observable area of the image capture unit 219 of FIG. 2. As a more specific example, the field-of-view 312 can be the region of space representing the observable area of the front-facing unit 221 of FIG. 2. The field-of-view 312 can also be displayed as an image on a display of the navigation system 100 such as the first display interface 230 of FIG. 2, the second display interface 240 of FIG. 2, or a combination thereof.

The gesture 302 can have a motion trajectory 314. The motion trajectory 314 is a path or direction undertaken by the appendage 306 through space. The motion trajectory 314 can be referenced using a three-dimensional coordinate system such as a three-dimensional Cartesian coordinate system, a polar coordinate system, or a combination thereof.

The three-dimensional coordinate system can have an origin 316. The origin 316 is a point of intersection of the axes of a coordinate system serving as a starting point of the gesture 302. The origin 316 can be fixed relative to a device in the navigation system 100, such as the first device 102. Alternatively, the origin 316 can vary depending on the gesture 302. For example, the origin 316 can be located in a region 0.50 meters away from the first device 102. As an additional example, the origin 316 can be located a fixed distance away from a body part of the user 304.

In the case of the three-dimensional Cartesian coordinate system, the motion trajectory 314 can be measured in relation to a depth axis 318, a lateral axis 320, a vertical axis 322, or a combination thereof. The depth axis 318 is a coordinate axis orthogonal or normal to a lens of the image capture unit 219. For example, as seen in FIG. 3, the first device 102 can be a smartphone mounted on a vehicle mount with both the first display interface 230 and a lens of the front-facing unit 221 facing the user 304. In this example, the depth axis 318 can be a coordinate axis orthogonal or normal to a lens or a light collection element of the front-facing unit 221.

The lateral axis 320 is a coordinate axis perpendicular to the depth axis 318. For example, the lateral axis 320 can be parallel to a width of the lens of the image capture unit 219. As an additional example, the lateral axis 320 can be parallel to a coronal or frontal plane of the user 304. In the above example of the first device 102 mounted on the vehicle mount, the lateral axis 320 can run along the width of the vehicle. As an additional example, the lateral axis 320 can run along a wingspan of the user 304.

The vertical axis 322 is a coordinate axis perpendicular to both the depth axis 318 and the lateral axis 320. For example, the vertical axis 322 can be parallel to a height of the lens of the image capture unit 219. As an additional example, the vertical axis 322 can be parallel to a height of the user 304. In the above example of the first device 102 mounted on the vehicle mount, the vertical axis 322 can run along the height of the vehicle.

FIG. 3 also depicts an image sequence 324 captured by the image capture unit 219 for representing the gesture 302. The image sequence 324 is images or representations of the appendage 306 along the motion trajectory 314. The image sequence 324 can include one or more pixel images, video frames, infrared images, ultraviolet images, thermal images, or a combination thereof of the gesture 302. Each image in the image sequence 324 can include a gesture contour 326 and a backdrop 328.

The gesture contour 326 represents an outline of the appendage 306 when the user 304 is making the gesture 302. The backdrop 328 is all other objects appearing in the field-of-view 312 of the image capture unit 219 other than the gesture contour 326. The backdrop 328 can include shapes, colors, objects, or a combination thereof appearing in the background of an image in the image sequence 324.

For example, the backdrop 328 can include shapes, colors, or objects representing an interior of a vehicle. As an additional example, the backdrop 328 can include shapes, colors, or objects representing a room of a house. The backdrop 328 can be determined using algorithms based on position markers, previously captured environments, or a combination thereof. The backdrop 328 can also be predetermined by the navigation system 100 or determined based on known interior environments or shapes.

The image sequence 324 can include a base image 330 and a further image 332. The base image 330 is any image in the image sequence 324 with the exception of the last image in the image sequence 324. The further image 332 is any image in the image sequence 324 with the exception of the base image 330. For example, the further image 332 can be the last image of the image sequence 324 and the base image 330 can be the image immediately preceding the further image 332. As an additional example, the base image 330 can be the "n−7" image in the image sequence 324 with "n" total images and the further image 332 can be the "n−2" image.

In addition to the gesture 302, the navigation system 100 can also detect an auditory signal 334. The auditory signal 334 is a sound or utterance detected in the vicinity of a device in the navigation system 100 such as the first device 102, the second device 106, or a combination thereof. The auditory signal 334 can be detected by the audio unit 225 of FIG. 2. For example, as shown in FIG. 3, the auditory signal 334 can originate from the user 304. The auditory signal 334 can include a noise, a statement, an utterance, a response, a voice command, or a combination thereof made by the user 304. The auditory signal 334 can also include a portion of a conversation carried on by the user 304, another individual, a device, or a combination thereof.

The auditory signal 334 can include an auditory cue 336. The auditory cue 336 is an audible input received by the navigation system 100 for affecting a change in a state of the navigation system 100. For example, the auditory cue 336 can be an audible input received through the audio unit 225 for affecting a change in the state of the first device 102. As a more specific example, the auditory cue 336 can be a voice command received from the user 304 for causing the navigation system 100 to perform an action or achieve a goal.

The navigation system 100 can determine the auditory cue 336 from the auditory signal 334 by taking into account a speech pattern 338, a synonym cluster 346, or a combination thereof. The speech pattern 338 is a manner of vocalization detected by the navigation system 100. The speech pattern 338 can include a grammatical organization 340, a repetition 342, a cadence, a speaking volume 344, or a combination thereof.

The grammatical organization 340 is a degree to which phrases or words of the auditory signal 334 follow a language convention. An assessment of the grammatical organization 340 of the auditory signal 334 can involve whether phrases or words of the auditory signal 334 follow rules concerning syntax or sentence construction. The grammatical organization 340 can be represented as a score or a scale. For example, a conversation detected by the navigation system 100 between the user 304 and another individual can obtain a higher score or ranker higher in terms of the grammatical organization 340 than a two-word voice command such as "Show Route."

The repetition 342 refers to a degree to which a word or phrase of the auditory signal 334 is reiterated. The cadence refers to a beat or rhythmic measure of speech. For example, the cadence and the speaking volume 344 of the user 304 can increase when the user 304 is under time pressure. As an additional example, instances of the repetition 342 can decrease when the user 304 engages in a conversation.

The synonym cluster 346 is a set of words or phrases having a similar meaning as a word or phrase in the auditory cue 336. The synonym cluster 346 can be used to determine or reaffirm a meaning for one or more words or phrases included as part of the auditory cue 336. The synonym cluster 346 can be implemented as a relational database, an array database, a columnar database, an object oriented database, or a combination thereof. The synonym cluster 346 can be populated by new words detected in the auditory signal 334 and content extracted from external sources such as dictionary databases, natural language datasets, online resources, or a combination thereof.

Additionally, the command motion 308 can be distinguished from the natural motion 310 based on a synchronicity 348 of a timing 349 of the gesture 302 and the auditory cue 336. The timing 349 of the gesture 302 and the auditory cue 336 refers to a detection time of the gesture 302 and the auditory cue 336. The synchronicity 348 of the gesture 302 and the auditory cue 336 refers to the degree to which the timing 349 of a word or phrase of the auditory cue 336 coincides or matches with the timing 349 of the gesture 302.

The synchronicity 348 of the timing 349 of the gesture 302 and the auditory cue 336 can be considered high when a prefix and a suffix of one or more words of the auditory cue 336 coincides with the beginning and end, respectively, of the motion trajectory 314. For example, the synchronicity 348 of the timing 349 of the gesture 302 and the auditory cue 336 can be considered high when the syllables of a word or phrase of the auditory cue 336 coincide with one or more changes in the motion trajectory 314 of the gesture 302. In addition, the navigation system 100 can determine the synchronicity 348 based on the timing 349 of the pronunciation and the timing 349 of images in the image sequence 324 of the gesture 302.

Moreover, the synchronicity 348 of the timing 349 of the gesture 302 and the auditory cue 336 can be considered high when a pronunciation of a word or phrase in the auditory cue 336 tracks or coincides with the motion trajectory 314 of the gesture 302. For example, as seen in FIG. 3, the synchronicity 348 of the word "mute" and an instance of the gesture 302 involving an open palm can be considered high when a pronunciation of the prefix "mu-" coincides with the base image 330 in the image sequence 324 and a pronunciation of the prefix "-te" coincides with the further image 332 in the image sequence 324.

The command motion 308 can also be distinguished from the natural motion 310 based on a contextual information 350. The contextual information 350 is an additional input or circumstance associated with or occurring alongside the gesture 302. The contextual information 350 can include a locational context 352, a temporal context 354, a user-specific context 356, an environmental context 358, or a combination thereof.

The locational context 352 concerns the physical location or travel path of a device in the navigation system 100 such as the first device 102, the second device 10, or a combination thereof. The locational context 352 can include a current location 360, a heading 362, an acceleration, a speed, or a combination thereof of the device in the navigation system 100. The current location 360 is a present geographic position of a device in the navigation system 100. The heading 362 is a compass direction of the path being taken by the device in the navigation system 100.

For example, as seen in FIG. 3, the locational context 352 can be the speed of a vehicle carrying the first device 102 at 55 miles per hour and the heading 362 can be the compass direction traveled by the vehicle at 51 degrees North and 18 degrees East. In addition, the locational context 352 can include information on any sudden accelerations or decelerations made by the vehicle.

The temporal context 354 concerns the time or date the gesture 302 is detected. The temporal context 354 can include a time-of-day, a day-of-the-week, a specific calendar day, or a combination thereof.

The user-specific context 356 is a circumstance surrounding the gesture 302 which relates to the user 304. The user-specific context 356 can include a historical behavior of the user 304, a peculiarity of the user 304, an agenda or itinerary of the user 304, an application usage by the user 304, or a combination thereof. For example, the user 304 can be prone to tapping on the steering wheel of a vehicle when the user 304 is driving the vehicle. In this example, the navigation system 100 can consider the propensity of the user 304 to make a tapping motion into account when distinguishing between the command motion 308 and the natural motion 310. As an additional example, the navigation system 100 can take into account a past interaction between the user 304 and the navigation system 100 to anticipate upcoming instances of the command motion 308.

The environmental context 358 is a condition or circumstance affecting a physical surrounding of a device in the navigation system 100. For example, the environmental context 358 can include a visibility level, a traffic condition, a weather condition, an object or individual, or a combination thereof in the proximity of a device in the navigation system 100 such as the first device 102.

The navigation system 100 can use the rear-facing unit 223 to determine the environmental context 358. For example, as seen in FIG. 3, the navigation system 100 can use the rear-facing unit 223 to capture an image of a nearby vehicle. As will be discussed in the sections that follow, the navigation system 100 can use the image of the nearby vehicle to help determine whether the gesture 302 captured by the front-facing unit 221 is the command motion 308 or the natural motion 310.

In addition, the navigation system 100 can use the image captured by the rear-facing unit 223 to expect a particular instance of the command motion 308. Although not shown in FIG. 3, it should be understood that the navigation system 100 can also use the rear-facing unit 223 to capture an image of a pedestrian, a road sign, an object in the road, a landmark, or a combination thereof.

The navigation system 100 can further distinguish between the command motion 308 and the natural motion 310 based on a motion blacklist 364. The motion blacklist 364 is a set of motions removed from consideration as the command motion 308. The motion blacklist 364 can include a previously captured motion considered to be the natural motion 310. The navigation system 100 can add motions to the motion blacklist 364 based on the motion trajectory 314 of the motion, the synchronicity 348 of the timing 249 of the gesture 302 and the auditory cue 336, the contextual information 350, or a combination thereof.

Once an instance of the gesture 302 is included in the motion blacklist 364, the navigation system 100 can remove the gesture 302 from the motion blacklist 364 by receiving an input from the user 304. In addition, the navigation system 100 can remove the gesture 302 from the motion blacklist 364 based on a change in context such as a change in the location context 352, the temporal context 354, the user-specific context 356, the environmental context 358, or a combination thereof. Moreover, the navigation system 100 can remove instances of the gesture 302 from the motion blacklist 364 when a new instance of the user 304 is detected using the navigation system 100.

The navigation system 100 can also maintain an auditory blacklist 366. The auditory blacklist 366 is a set of utterances or words removed from consideration as the auditory cue 336. For example, the auditory blacklist 366 can include words or phrases serving as prepositions, conjunctions, articles, fillers, or a combination thereof. In addition, the navigation system 100 can add utterances or words to the auditory blacklist 366 based on low instances of the synchronicity 348 of the timing 349 of the utterance or word with the gesture 302. Moreover, the navigation system 100 can add words or phrases to the auditory blacklist 36 based on the contextual information 350.

Once a word or phrase is included in the auditory blacklist 366, the navigation system 100 can remove the word or phrase from the auditory blacklist 366 by receiving an input from the user 304. In addition, the navigation system 100 can remove the word or phrase from the auditory blacklist 366 based on a change in context such as a change in the location context 352, the temporal context 354, the user-specific context 356, the environmental context 358, or a combination thereof. Moreover, the navigation system 100 can remove word or phrases from the auditory blacklist 366 when a new instance of the user 304 is detected using the navigation system 100.

FIG. 3 depicts two examples of a command combination 368. The command combination 368 is a designated input for instructing the navigation system 100 with unique instances of the command motion 308 and the auditory cue 336. For example, as shown in FIG. 3, the command combination 368 can include a mute command 370.

The mute command 370 is an instance of the command combination 368 for muting an audio instruction 372. The audio instruction 372 is an audible directive provided by the navigation system 100 for guiding the user 304. For example, the audio instruction 372 can include a navigation instruction, an engine alert, a safety instruction, or a combination thereof. As a more specific example, the navigation instruction can include a set of audio directions for guiding the user 304 along a navigation path.

As seen in FIG. 3, the mute command 370 can include a mute gesture 374 and a mute cue 376. The mute gesture 374 is an instance of the gesture 302 for instructing the navigation system 100 to turn off or lower the volume of a sound. For example, the mute gesture 374 can involve a hand of the user 304 raised in an open palm configuration. As a more specific example, the open palm configuration can involve the palm of the hand facing away from the body of the user 304.

The motion trajectory 314 of the mute gesture 374 can involve the open palm of the user 304 directed along the lateral axis 320 in a leftward direction from the perspective of the image capture unit 219 of the first device 102. The mute command 370 can also include the mute cue 376 in sync with the mute gesture 374.

The mute cue 376 is an instance of the auditory cue 336 for instructing the navigation system 100 to turn off or lower the volume of a sound. For example, the mute cue 376 can include a verbalized instance of the word "mute" or a synonym of the word "mute" such as "quiet," "silent," "hush," or a combination thereof. As will be discussed in the sections that follow, the navigation system 100 can also take into account an instance of the contextual information 350 when generating the mute command 370. For example, the navigation system 100 can take into account an instance of the user-specific context 356 such as a familiarity of the user 304 with a driving route when determining whether to implement the mute command 370 to mute a set of navigation instructions.

FIG. 3 also depicts a navigation command 378. The navigation command 378 is an instance of the command combination 368 for generating a navigation route 380 to a destination 382. The navigation route 380 is a guidance path provided by the navigation system 100. For example, the navigation route 380 can be generated through a navigation application. The destination 382 is an end location of the navigation route 380. The navigation route 380 can include the destination 382 and a starting location denoting a starting point of the navigation route 380. The navigation command 378 can include a navigation gesture 386 and a navigation cue 388.

For example, as seen in FIG. 3, the navigation gesture 386 can involve a hand of the user 304 in an O-shape with the thumb of the hand making contact with the tip of the index finger. The motion trajectory 314 of the navigation gesture 386 can involve the hand of the user 304 in the O-shape directed toward the image capture unit 219 of the first device 102 along the depth axis 318. The navigation command 378 can also include the navigation cue 388 in sync with the navigation gesture 386.

The navigation cue 388 is an instance of the auditory cue 336 related to a navigation function. For example, the navigation cue 388 can include a verbalized instance of the word "home" or a synonym of the word "home" such as "house." As will be discussed in the sections that follow, the navigation system 100 can also take into account an instance of the contextual information 350 when generating the navigation command 378.

For example, the navigation system 100 can take into account an instance of the locational context 352 such as the current location 360, the heading 362, the speed, or a combination thereof. As an additional example, the navigation system 100 can also analyze instances of the user-specific context 356 such as past routes traveled by the user 304, an address book of the user 304, a calendar of the user 304, or a combination thereof to determine a geographic location or coordinate position associated with the navigation cue 388 of "home."

Figure 4:
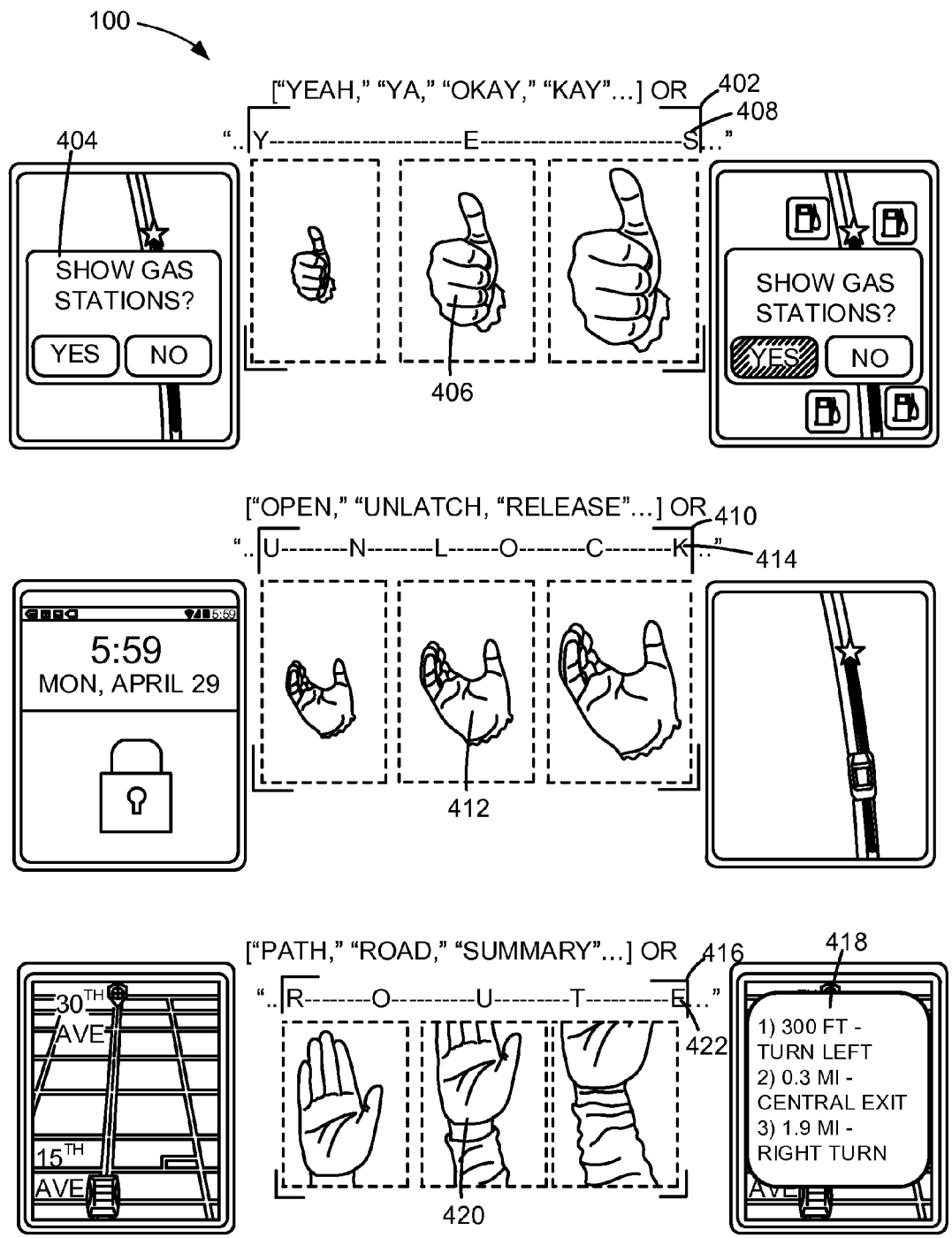
FIG. 4 depicts examples of display interfaces of the navigation system.

Referring now to FIG. 4 therein is shown example display interfaces of the navigation system 100 before and after receiving instances of the command combination 368 of FIG. 3. For example, the first display interface 230 of FIG. 2 can communicate a question prompt 404. The question prompt 404 is an inquiry message for soliciting a response from the user 304 of FIG. 3. The question prompt 404 can be implemented as a pop-up window, a modal window, a message window, an audio message, or a combination thereof. For example, as seen in FIG. 4, the question prompt 404 can display a message of "Show Gas Stations?"

As seen in FIG. 4, the user 304 can respond to the question prompt 404 through an affirmative command 402. The affirmative command 402 is an instance of the command combination 368 for responding to an inquiry. The affirmative command 402 can include an affirmative gesture 406 and an affirmative cue 408.

For example, the affirmative gesture 406 can involve a hand of the user 304 in a thumbs-up configuration. The motion trajectory 314 of FIG. 3 of the affirmative gesture 406 can involve the hand of the user 304 in the thumbs-up configuration directed toward the image capture unit 219 of the first device 102 along the depth axis 318 of FIG. 3. The affirmative command 402 can also include an affirmative cue 408 in sync with the affirmative gesture 406.

The affirmative cue 408 is an instance of the auditory cue 336 of FIG. 3 for indicating agreement in response to an inquiry such as the question prompt 404. For example, the affirmative cue 408 can include a verbalized instance of the word "yes" or a synonym of the word "yes" such as "yeah," "ya," "okay," "kay," or a combination thereof.

As seen in FIG. 4, the first display interface 230 can also show a locked screen for notifying the user 304 of a locked state of the first device 102 of FIG. 1. The user 304 can unlock the first device 102 through an unlock command 410. The unlock command 410 is an instance of the command combination 368 for unlocking a device. The unlock command 410 can include an unlock gesture 412 and an unlock cue 414.

For example, the unlock gesture 412 can involve a hand of the user 304 formed in a U-shape. The motion trajectory 314 of the unlock gesture 412 can involve the hand of the user 304 in a U-shape directed toward the image capture unit 219 of the first device 102 along the depth axis 318. The unlock command 410 can also include an unlock cue 414 in sync with the unlock gesture 412.

The unlock cue 414 is an instance of the auditory cue 336 for unlocking a device. For example, the unlock cue 414 can include a verbalized instance of the word "unlock." In addition, the unlock cue 414 can include a synonym of the word "unlock" such as "open," "unlatch," "release," or a combination thereof.

FIG. 4 also depicts a display command 416. The display command 416 is an instance of the command combination 368 for arranging or navigating a display interface such as the first display interface 230, the second display interface 240 of FIG. 2, or a combination thereof. For example, the display command 416 can be used to expose a graphic page 418 on the first display interface 230. The graphic page 418 can include a webpage or application page showing a map graphic, a route summary, navigation graphic, or a combination thereof. The display command 416 can include a page view gesture 420 and a page invocation cue 422.

The page view gesture 420 can involve the open palm of the user 304 directed along the vertical axis 322 of FIG. 3 in an upward direction from the perspective of the image capture unit 219 of the first device 102. The display command 416 can also include the page invocation cue 422 in sync with the page view gesture 420.

The page invocation cue 422 is an instance of the auditory cue 336 for instructing the navigation system 100 to reveal an instance of the graphic page 418. For example, the page invocation cue 422 can include a verbalized instance of the page requested by the user 304. As a more specific example, the page invocation cue 422 can include a verbalized instance of the word "route" or the phrase "route summary" to instruct the navigation system 100 to display an instance of the graphic page 418 having a route summary. In this example, the page invocation cue 422 can also include one or more words synonymous with the word "route" such as "path," "road," or a combination thereof.

As will be discussed in the sections that follow, the navigation system 100 can also take into account instances of the contextual information 350 of FIG. 3 when generating any of the affirmative command 402, the unlock command 410, or the display command 416. For example, the navigation system 100 can take into account the temporal context 354 of FIG. 3, such as the time-of-day, the environmental context 358 of FIG. 3, such as an image of a vehicle in the proximity of the user 304, the locational context 352 of FIG. 3, such as the heading 362 of FIG. 3 of the first device 102, or a combination thereof.

Figure 5:
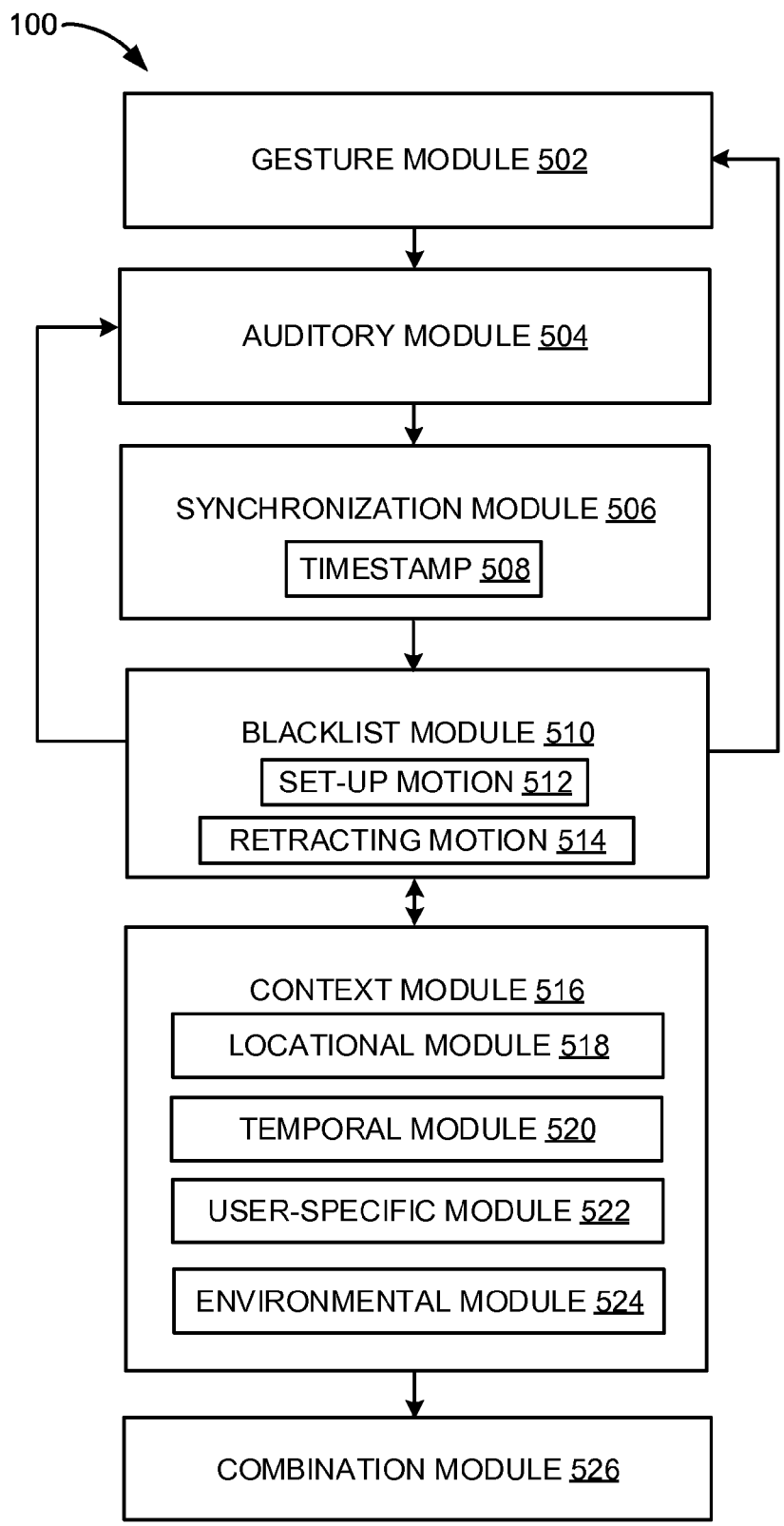
FIG. 5 is a control flow of the navigation system.

Referring now to FIG. 5, therein is shown a control flow of the navigation system 100 with a touchless command mechanism. The navigation system 100 can include a gesture module 502, an auditory module 504, a synchronization module 506, a blacklist module 510, a context module 516, a combination module 526, or a combination thereof.

The modules noted above and below are coupled to one another by having an operation of one module influence an operation of another module or other modules, by having an output of one module as an input of another module or other modules using wired or wireless connections, or a combination thereof.

The gesture module 502 is configured to capture the gesture 302 of FIG. 3 and to determine the motion trajectory 314 of FIG. 3. The gesture module 502 can capture the gesture 302 by interacting with an image capture component of the navigation system 100. For example, the gesture module 502 can capture the gesture 302 of the user 304 of FIG. 3 by interacting with the image capture unit 219 of FIG. 2.

As a more specific example, the first device 102 of FIG. 1 of the navigation system 100 can be positioned in a vehicle mount and the gesture module 502 can instruct the front-facing unit 221 of FIG. 2 to capture the gesture 302. As an additional example not shown in the figures, the first device 102 can be embedded in a vehicle and the image capture unit 219 can be a camera or motion sensor also embedded in the vehicle.

The gesture module 502 can interact with the image capture unit 219 to capture the gesture 302 in the field-of-view 312 of FIG. 3. The gesture module 502 can instruct the image capture unit 219 to capture the gesture 302 when the appendage 306 of FIG. 3 appears in the field-of-view 312. For example, the gesture module 502 can instruct the image capture unit 219 to capture the gesture 302 when a hand of the user 304 appears in the field-of-view 312 of the image capture unit 219. Additionally, the gesture module 502 can instruct the image capture unit 219 to capture the gesture 302 when the image capture unit 219 detects an additional object, a color contrast, or a combination thereof in the backdrop 328 of FIG. 3.

Alternatively, the gesture module 502 can interact with the audio unit 225 of FIG. 2 and instruct the image capture unit 219 to capture the gesture 302 when the audio unit 225 detects the auditory signal 334 of FIG. 3. Detection of the auditory signal 334 will be discussed in more detail in the sections that follow. Moreover, the gesture module 502 can also interact with other sensors in the first device 102 such as electric field sensors, acoustic sensors, or a combination thereof to detect the gesture 302.

The image capture unit 219 can capture the gesture 302 through one or more images of the appendage 306 of the user 304 in the field-of-view 312. The images can include pixel images, video frames, IR images, UV images, thermal images, or a combination thereof.

The gesture module 502 can determine the motion trajectory 314 of the gesture 302 in a number of ways. The gesture module 502 can determine the motion trajectory 314 based on the image sequence 324 of FIG. 3. More specifically, the gesture module 502 can determine the motion trajectory 314 by comparing the further image 332 of FIG. 3 against the base image 330 of FIG. 3.

For example, one instance of the gesture 302 can involve a raised palm of the user 304 moving toward the image capture unit 219. The gesture module 502 can determine the motion trajectory 314 of this instance of the gesture 302 by comparing the further image 332 of the palm against the base image 330 of the palm. More specifically, the gesture module 502 can analyze a change in the size of the gesture contour 326 of FIG. 3 relative to a change in the size of the backdrop 328. For example, the gesture contour 326 of the further image 332 can double in size relative to the gesture contour 326 of the base image 330 and the area of the image taken up by the backdrop 328 can decrease in size as more of the image is taken up by the palm.

The gesture module 502 can also determine the motion trajectory 314 of the gesture 302 by comparing the further image 332 against the base image 330 for a change in the spatial position of the gesture contour 326 along the vertical axis 322 of FIG. 3 or the lateral axis 320 of FIG. 3. In the example above, the gesture module 502 can determine the motion trajectory 314 of the raised palm motion as moving toward the image capture unit 219 along the depth axis 318 of FIG. 3 because a comparison of the further image 332 against the base image 330 shows no change in the spatial position of the gesture contour 326 of the palm along either the vertical axis 322 or the lateral axis 320.

As an additional example, another instance of the gesture 302 can involve the raised palm of the user 304 moving leftward from the perspective of the image capture unit 219 along the lateral axis 320. The gesture module 502 can determine the motion trajectory 314 of this instance of the gesture 302 by analyzing a change in the spatial position of a characteristic of the gesture contour 326 such as a palm crease, a finger contour, or a combination thereof without a substantial change in the size of the gesture contour 326. In addition, the gesture 302 can take into account the disappearance of the gesture contour 326, the characteristic, or a combination thereof from the field-of-view 312 and the accompanying exposure of portions of the backdrop 328 formerly blocked by the gesture contour 326.

While the above examples discuss the motion trajectory 314 as moving along a singular axis, it should be understood that the motion trajectory 314 of the gesture 302 can traverse a variety of paths and can be referenced using multiple axes. Furthermore, while the examples illustrated in FIGS. 3 and 4 show the image sequence 324 having three exemplary images, it should be understood that the image sequence 324 can include hundreds or thousands of images or frames. In addition, the image sequence 324 can include repeating sets of images when the user 304 repeats the motion trajectory 314 of the gesture 302 more than once.

The gesture contour 326 can include one or more edges, edge points, reference lines, reference points, or a combination thereof. The gesture module 502 can compare the gesture contour 326 of images in the image sequence 324 using a variety of gesture detection algorithms or methods including an object detection algorithm, an edge matching algorithm, a gradient matching algorithm, a conditional density propagation algorithm, a feature matching algorithm, a block-based correlation algorithm, a block matching algorithm, a Hidden Markov model, or a combination thereof.

The gesture module 502 can be part of the first software 226 of FIG. 2, the second software 242 of FIG. 2, or a combination thereof. The first control unit 212 of FIG. 2 can execute the first software 226, the second control unit 234 of FIG. 4 can execute the second software 242, or a combination thereof to capture the gesture 302 and determine the motion trajectory 314.

The gesture module 502 can also interact with the first display interface 230, the second display interface 240, or a combination thereof to display the gesture 302 captured by the image capture unit 219 to the user 304. Moreover, the gesture module 502 can also communicate the gesture 302, the motion trajectory 314, or a combination thereof between devices through the first communication unit 216 of FIG. 2, the second communication unit 236 of FIG. 2, or a combination thereof. After capturing the gesture 302 and determining the motion trajectory 314, the control flow can pass from the gesture module 502 to the auditory module 504.

The auditory module 504 is configured to determine the auditory cue 336 of FIG. 3 from the auditory signal 334. The auditory module 504 can interact with the audio unit 225 to detect the auditory signal 334. The auditory module 504 can use automatic speech recognition methods including isolated word recognition, continuous speech recognition, or a combination thereof to transform acoustic signals detected by the audio unit 225 into text. More specifically, the auditory module 504 can use Hidden Markov models, stochastic language models, machine learning algorithms, or a combination thereof to perform speech recognition.

The auditory module 504 can determine the auditory cue 336 from the auditory signal 334 by analyzing the speech pattern 338 of the auditory signal 334. More specifically, the auditory module 504 can apply machine-learning algorithms, Hidden Markov models, stochastic language modeling, or a combination thereof to analyze the grammatical organization 340 of FIG. 3, the instances of the repetition 342 of FIG. 3, the cadence, the speaking volume 344 of FIG. 3, or a combination thereof of the auditory signal 334.

For example, the auditory module 504 can discard portions of the auditory signal 334 exhibiting a high degree of the grammatical organization 340. Moreover, the auditory module 504 can isolate portions of the auditory signal 334 where the cadence or the speaking volume 344 of the speaker changes within a predefined time period. In this example, the predefined time period can be a 30 second interval, a 10 second interval, or a 5 second interval.

After isolating portions of the auditory signal 334 where the cadence or the speaking volume 344 has changed, the auditory module 504 can isolate words or phrases exhibiting an instance of the repetition 342. For example, the auditory module 504 can determine the word "mute" as the auditory cue 336 when the auditory module 504 detects the word repeated by the speaker at a high cadence and volume.

The auditory module 504 can also determine the auditory cue 336 by extracting one or more synonyms of words or phrases detected in the auditory signal 334. The auditory module 504 can extract such synonyms by searching the synonym cluster 346 of FIG. 3. The auditory module 504 can use the synonym cluster 346 to determine or reaffirm a meaning for words of phrases detected in the auditory signal 334.

The auditory module 504 can use the synonym cluster 346 to determine or reaffirm the meaning of a word or phrase detected in the auditory signal 334 by searching the synonym cluster 346 for synonyms of the word or phrase. The auditory module 504 can then determine if any synonyms of the word or phrase were predetermined by the navigation system 100 as an instance of the auditory cue 336. If not, the auditory module 504 can extract definitions of the word or phrase detected in the auditory signal 334 and all synonyms of the word or phrase from a dictionary database, a natural language dataset, an online resource, or a combination thereof. As will be discussed in the sections that follow, the auditory module 504 can then interact with other modules in the navigation system 100 to analyze the contextual information 350 to determine whether the present context calls for any words or phrases included as part of the auditory cue 336.

The auditory module 504 can search the synonym cluster 346 by using a tree search algorithm, a graph search algorithm, or a combination thereof. For example, the auditory module 504 can detect the word "hush" repeated by the user 304 at a high cadence and volume. In this example, the auditory module 504 can search the synonym cluster 346 and obtain synonyms of the word "hush" such as "mute," "quiet," "silent" or a combination thereof. As will be discussed in the sections that follow, the auditory module 504 can then interact with other modules in the navigation system 100 to analyze the gesture 302 and the contextual information 350 to determine whether the user 304 intended to instruct the navigation system 100 to lower the volume of an audio output based on the auditory cue 336 of any of the words "hush," "mute," "quiet," or "silent." The synonym cluster 346 can be stored in the first storage unit 214 of FIG. 2, the second storage unit 246 of FIG. 2, or a combination thereof.

The auditory module 504 can also add the word "hush" and one or more of its synonyms to a database containing other words or phrases previously used as the auditory cue 336. The database can be stored in the first storage unit 214 of FIG. 2, the second storage unit 246, or a combination thereof.

The auditory module 504 can be part of the first software 226, the second software 242, or a combination thereof. The first control unit 212 can execute the first software 226, the second control unit 234 can execute the second software 242, or a combination thereof to detect the auditory signal 334 and determine the auditory cue 336 from the auditory signal 334.

The auditory module 504 can also communicate the auditory cue 336 between devices through the first communication unit 216, the second communication unit 236, or a combination thereof. After detecting the auditory signal 334 and determining the auditory cue 336, the control flow can pass from the auditory module 504 to the synchronization module 506.

The synchronization module 506 is configured to determine the synchronicity 348 of FIG. 3 of the timing 349 of FIG. 3 of the gesture 302 and the auditory cue 336. As indicated previously, the synchronicity 348 refers to the timing 349 of a word or phrase of the auditory cue 336 coinciding with the timing 349 of the gesture 302. The synchronization module 506 can determine the synchronicity 348 of the timing 349 of the gesture 302 and the auditory cue 336 by applying a timestamp 508 to images of the image sequence 324 and verbalized instances of the auditory cue 336.

The timestamp 508 is an electronic marker for indicating the timing 349 of an event or occurrence. The timestamp 508 can include an interrupt, a log entry, a variable value, an index, an alphanumeric entry, a digital signature, or a combination thereof. The timestamp 508 can be included in a file header.

The synchronization module 506 can determine that an instance of the gesture 302 and the auditory cue 336 have a high degree of the synchronicity 348 when the motion trajectory 314 of the gesture 302 begins and ends with the pronunciation or verbalization of a word or phrase of the auditory cue 336.

For example, the synchronization module 506 can determine the synchronicity 348 of the timing 349 of the mute gesture 374 of FIG. 3 and the mute cue 376 of FIG. 3 by applying the timestamp 508 to each image in the image sequence 324 of the mute gesture 374. The synchronization module 506 can apply the timestamp 508 when the image is captured by the image capture unit 219. In addition, the synchronization module 506 can also apply the timestamp 508 to the word "mute" detected by the audio unit 225. In the case of the auditory cue 336, the synchronization module 506 can apply the timestamp 508 to each syllable, phoneme, intonation change, or a combination thereof.

More specifically, the synchronization module 506 can analyze the acoustic wave signal of the auditory cue 336 and apply the timestamp 508 to changes in the wave signal. In addition, the synchronization module 506 can also apply the timestamp 508 to silences or pauses detected between recurrences of the auditory cue 336. Similarly, the synchronization module 506 can apply the timestamp 508 to images of the image sequence 324 showing only the backdrop 328.

The synchronization module 506 can then compare the timing 349 associated with the images of the gesture 302 with the timing 349 associated with the pronunciation of the auditory cue 336. The synchronization module 506 can compare the timing 349 of the images of the gesture 302 with the timing 349 of the pronunciation of the auditory cue 336 by comparing a pronunciation of a prefix, a suffix, or a combination thereof of one or more words of the auditory cue 336 with the initial and concluding images, respectively, of the motion trajectory 314.

Continuing with the example above, the synchronicity 348 of the timing 349 of the mute gesture 374 and the mute cue 376 can be considered high when the pronunciation of the prefix "mu-" of the word "mute" coincides with the initial images in the image sequence 324 of the mute gesture 374 and the pronunciation of the suffix "-te" coincides with the latter images in the image sequence 324.

In addition, the synchronization module 506 can compare the timing 349 of the images of the gesture 302 with the timing 349 of the auditory cue 336 by comparing pauses between words detected in the auditory signal 334 and images in the image sequence 324. For example, the synchronicity 348 of the timing 349 of the mute gesture 374 and the mute cue 376 can be considered high if pauses between the word "mute" coincide with images in the image sequence 324 which do not show the appendage 306 of the user 304 making the mute gesture 374.

The synchronization module 506 can also analyze repeated occurrences of the gesture 302 and the auditory cue 336 to determine how well the gesture 302 coincides with the auditory cue 336. For example, the synchronization module 506 can detect the user 304 making the mute gesture 374 a total of five times and pronouncing the word "mute" a total of five times. The synchronization module 506 can consider the synchronicity 348 of the mute gesture 374 and the mute cue 376 to be high if all five occurrences of the mute gesture 374 coincide with all five instances of the word "mute."

The synchronization module 506 can be part of the first software 226, the second software 242, or a combination thereof. The first control unit 212 can execute the first software 226, the second control unit 234 can execute the second software 242, or a combination thereof to determine the synchronicity 348 of the gesture 302 and the auditory cue 336.

The synchronization module 506 can also communicate the synchronicity 348 between devices through the first communication unit 216, the second communication unit 236, or a combination thereof. After determining the synchronicity 348 of the gesture 302 and the auditory cue 336, the control flow can pass from the synchronization module 506 to the blacklist module 510.

The blacklist module 510 is configured to generate the motion blacklist 364 of FIG. 3, the auditory blacklist 366 of FIG. 3, or a combination thereof. The blacklist module 510 can generate the motion blacklist 364 by populating the motion blacklist 364 with instances of the natural motion 310 of FIG. 3, a set-up motion 512, a retracting motion 514, or a combination thereof. The blacklist module 510 can populate the motion blacklist 364 with instances of the natural motion 310 by extracting images or models of appendage configurations corresponding to natural human gestures or motions from a gesture database, an online database, an image database, or a combination thereof. In addition, the blacklist module 510 can interact with the user 304 and store motions indicated by the user 304 as the natural motion 310.

Moreover, the blacklist module 510 can generate the motion blacklist 364 by adding instances of the set-up motion 512, the retracting motion 514, or a combination thereof. The set-up motion 512 is an instance of the gesture 302 undertaken in preparation for commencing the gesture 302. For example, the set-up motion 512 can include an instance of the gesture 302 by the user 304 to bring a hand from a lap of the user 304 to the sightline of the image capture unit 219. As an additional example, the set-up motion 512 can include an instance of the gesture 302 by the user 304 to shape the appendage 306 of the user 304 into a distinct configuration such as a thumbs-up configuration, an O-configuration, a point configuration, or a combination thereof.

The blacklist module 510 can identify the set-up motion 512 based on the motion trajectory 314 of the set-up motion 512. For example, the blacklist module 510 can identify a motion as the set-up motion 512 if the motion trajectory 314 of the gesture 302 begins outside of the field-of-view 312 of the image capture unit 219. In addition, the blacklist module 510 can identify the gesture 302 as the set-up motion 512 by comparing latter images of the image sequence 324 of the gesture 302 against initial images of the image sequence 324 of known instances of the command motion 308.

The retracting motion 514 is an instance of the gesture 302 undertaken for bringing a body part of the user 304 back to a starting point for undertaking a repeat instance of the gesture 302. The blacklist module 510 can identify the retracting motion 514 based on the timing 349 of the retracting motion 514, the motion trajectory 314 of the retracting motion 514, or a combination thereof.

The backlist module 510 can identify an instance of the gesture 302 as the retracting motion 514 if the gesture 302 occurs immediately after a known instance of the command motion 308 and is repeated along with the command motion 308. In addition, the blacklist module 510 can identify the gesture 302 as the retracting motion 514 if the image sequence 324 of the gesture 302 closely resembles the image sequence 324 of a known instance of the command motion 308 in a reverse order.

The blacklist module 510 can also add motions to the motion blacklist 364 if such motions do not exhibit high instances of the synchronicity 348 with the auditory cue 336. The blacklist module 510 can interact with the gesture module 502 to prevent the gesture module 502 from analyzing instances of the gesture 302 which match those included as part of the motion blacklist 364.

The blacklist module 510 can interact with the gesture module 502 to undertake an initial comparison of the gesture 302 captured by the image capture unit 219 with the gesture 302 included as part of the motion blacklist 364. The blacklist module 510 can use machine-learning algorithms, edge matching algorithms, gradient matching algorithms, conditional density propagation algorithms, feature matching algorithms, block-based correlation algorithms, block matching algorithms, training classifiers, or a combination thereof to perform the comparison.

The motion blacklist 364 can be implemented as a relational database, an array database, a columnar database, a hash table, an objected oriented database, or a combination thereof. The blacklist module 510 can store the motion blacklist 364 in the first storage unit 214, the second storage unit 246, or a combination thereof.

The blacklist module 510 can also generate the auditory blacklist 366 by populating the auditory blacklist 366 with words or phrases classified as prepositions, pronouns, conjunctions, articles, fillers, or a combination thereof. For example, the user 304 can instruct the navigation system 100 with the sentence: "Take uhh me ummm home uh home." The blacklist module 510 can pare down the number of words in this instruction to only the words "take" and "home" and determine the word "home" as the auditory cue 336 based on the synchronicity 348 of the word with the gesture 302.

The blacklist module 510 can populate the auditory blacklist 366 with prepositions, pronouns, conjunctions, articles, or fillers extracted from external sources such as dictionary databases, natural language datasets, online resources, or a combination thereof. In addition, the blacklist module 510 can also add words detected from the auditory signal 334 which exhibit low instances of the synchronicity 348 with the gesture 302. The blacklist module 510 can also receive feedback or input from the user 304 for words or phrases that can be added to the auditory blacklist 366.

The blacklist module 510 can interact with the auditory module 504 to undertake an initial comparison of the word or phrases detected by the audio unit 225 with the words or phrases included as part of the auditory blacklist 366. The blacklist module 510 can use machine-learning algorithms, Hidden Markov models, stochastic language models, training classifiers, or a combination thereof to perform the comparison.

The auditory blacklist 366 can be implemented as a relational database, an array database, a columnar database, a hash table, an objected oriented database, or a combination thereof. The blacklist module 510 can store the auditory blacklist 366 in the first storage unit 214, the second storage unit 246, or a combination thereof.

The blacklist module 510 can be part of the first software 226, the second software 242, or a combination thereof. The first control unit 212 of FIG. 2 can execute the first software 226, the second control unit 234 of FIG. 4 can execute the second software 242, or a combination thereof to generate the motion blacklist 364 and the auditory blacklist 366.

The blacklist module 510 can also communicate the motion blacklist 364, the auditory blacklist 366, portions therein, a combination thereof between devices through the first communication unit 216, the second communication unit 236, or a combination thereof. After generating the motion blacklist 364 and the auditory blacklist 366, the control flow can pass from the blacklist module 510 to the context module 516.

The context module 516 is configured to distinguish between the command motion 308 and the natural motion 310 based on the gesture 302, the auditory cue 336, and the contextual information 350. The context module 516 can distinguish between the command motion 308 and the natural motion 310 by analyzing the contextual information 350.

The context module 516 can include a locational module 518, a temporal module 520, a user-specific module 522, an environmental module 524, or a combination thereof. The locational module 518 is configured to determine the locational context 352 of FIG. 3 at the time of or prior to the detection of the gesture 302, the auditory cue 336, or a combination thereof. The locational context 352 can include the current location 360 of FIG. 3, the heading 362 of FIG. 3, the acceleration or deceleration, the speed, or a combination thereof of a device in the navigation system 100 such as the first device 102. For example, when the first device 102 is carried by a vehicle, the location module 518 can determine the speed or acceleration of the vehicle using the sensors in the first device 102.

The locational module 518 can interact with the location unit 220 of FIG. 2 to determine the locational context 352. The locational module 518 can interact with the location unit 220 through the location interface 232 of FIG. 2. For example, the locational module 518 can interact with the accelerometer of the location unit 220 to determine the acceleration or deceleration of the first device 102 or the vehicle carrying the first device 102. As an additional example, the locational module 518 can interact with the GPS of the location unit 220 to determine the current location 360 of the first device 102 or the current location 360 of the vehicle carrying the first device 102.

The locational module 518 can analyze the locational context 352 in response or prior to detecting the gesture 302, the auditory cue 336, or a combination thereof. For example, as seen in FIG. 3, the navigation system 100 can capture the user 304 making an instance of the gesture 302 with the hand of the user 304 in an O-shape directed toward the image capture unit 219 along the depth axis 318. The navigation system 100 can also detect the user 304 repeating the word "home" in synch with the gesture 302.

In this example, the locational module 518 can interact with the location unit 220 and determine the locational context 352 of the first device 102 as proceeding in a northeast direction at 55 miles per hour. Based on the information concerning the heading 362 and the speed, the locational module 518 can determine that the user 304 intends the gesture 302 to be an instance of the command motion 308 and the word "home" as the auditory cue 336. The locational module 518 can then interact with one or more other modules in the navigation system 100 to generate an instance of the navigation route 380 of FIG. 3 where the destination 382 of FIG. 3 is the home of the user 304.

On the contrary, the navigation system 100 can also capture an instance of the gesture 302 involving the open palm of the user 304 directed along the lateral axis 320 in a waving motion. The navigation system 100 can also detect the user 304 repeating the word "hi" in connection with the gesture 302. In this example, the locational module 518 can interact with the location unit 220 and determine that the first device 102 is stationary and no acceleration was detected in the last 30 minutes. Based on this information, the locational module 518 can determine the user 304 intends the gesture 302 to be an instance of the natural motion 310 and the word "hi" as a greeting rather than the auditory cue 336.

The temporal module 520 is configured to determine the temporal context 354 associated with the gesture 302, the auditory cue 336, or a combination thereof. The temporal context 354 can include the time-of-day, the day-of-the-week, the specific calendar day, or a combination thereof. The temporal module 520 can analyze the temporal context 354 in response to the gesture 302, the auditory cue 336, or a combination thereof.

For example, as seen in FIG. 3, the navigation system 100 can capture the user 304 making an instance of the gesture 302 involving the open palm of the user 304 directed along the lateral axis 320 in a leftward direction from the perspective of the image capture unit 219. The navigation system 100 can also detect the user 304 saying the word "mute" in connection with the gesture 302. In this example, the temporal module 520 can analyze the time-of-day and the day-of-the-week and determine that the user 304 is commuting to or from work.

In addition, the temporal module 520 can also interact with the locational module 518 and determine that the user 304 is traveling a route familiar to the user 304. Base on this information, the temporal module 520 can determine the user 304 intends the gesture 302 to be an instance of the command motion 308 to mute an instance of the audio instruction 372 such as an audible navigation instruction. The temporal module 520 can then interact with one or more other modules in the navigation system 100 to turn off the audible navigation instruction.

The temporal module 520 can also analyze the calendar of the user 304 such as a calendar stored in the first device 102, the second device 106, or a combination thereof. The temporal module 520 can use the calendar to determine whether the user 304 will be traveling to a particular destination on a particular day at a particular time. In this instance, the temporal module 520 can more easily recognize any instances of the gesture 302 received on the calendared day and, more specifically, in proximity to the calendared time as the command motion 308.

The user-specific module 522 is configured to determine the user-specific context 356 of FIG. 3 associated with the gesture 302, the auditory cue 336, or a combination thereof. The user-specific context 356 can include the historical behavior of the user 304, device usage by the user 304, application usage by the user 304, or a combination thereof. The user-specific module 522 can analyze the user-specific context 356 in response to the gesture 302, the auditory cue 336, or a combination thereof.

For example, the navigation system 100 can capture the user 304 making a thumbs-up motion toward the image capture unit 219 in response to the question prompt 404 of FIG. 4 of "Show Gas Stations?" The navigation system 100 can also detect the user repeating the word "yes." In this situation, the user-specific module 522 can analyze the past behavior of the user 304 with respect to the first device 102 and see that the user 304 previously searched for gas stations using an online review application. Based on this information, the user-specific module 522 can determine the user 304 intends the gesture 302 to be an instance of the command motion 308 and the word "yes" to be an instance of the auditory cue 336.

As an additional example, the user-specific module 522 can notice the user 304 previously applying a touch gesture to a display interface of the navigation system 100, such as the first display interface 230, to lower the volume of an audio output produced by an application on the first device 102. In this case, the user-specific module 522 can determine any instances of the gesture 302 made by the user 304 in connection with the word "mute" or synonyms of the word "mute" as the command motion 308.

In another example, the navigation system 100 can capture the user 304 making an instance of the gesture 302 involving the open palm of the user 304 directed upward along the vertical axis 322. At the same time, the navigation system 100 can detect the user 304 repeating the word "route." In this example, the user-specific module 522 can analyze the past routes traveled by the user 304 and characterize the current route traveled by the user 304 as a familiar route. Based on this information, the user-specific module 522 can determine the gesture 302 as an instance of the command motion 308 to display a route summary page. The user-specific module 522 can interact with one or more other modules in the navigation system 100 to display the route summary on a display of the navigation system 100.

The environmental module 524 is configured to determine the environmental context 358 of FIG. 3 associated with the gesture 302, the auditory cue 336, or a combination thereof. The environmental context 358 can include the visibility level, the traffic condition, the weather condition, an object or individual, or a combination thereof in the proximity of a device in the navigation system 100 such as the first device 102.

The environmental module 524 can interact with the rear-facing unit 223 of the image capture unit 219 to determine the environmental context 358 in the proximity of a device in the navigation system 100 such as the first device 102. For example, the first device 102 can be mounted in a vehicle mount with the rear-facing unit 223 facing the front windshield of the vehicle. The rear-facing unit 223 can capture the visibility level, the traffic condition, the weather condition, an object or individual, or a combination thereof in the field-of-view 312 of the rear-facing unit 223. The environmental module 524 can also interact with the front-facing unit 221 to capture the environmental context 358 visible through the back windshield of the vehicle carrying the first device 102.

Continuing with the example above, the rear-facing unit 223 can capture the contour of a taillight of a vehicle immediately ahead of the vehicle carrying the first device 102. As an additional example, the rear-facing unit 223 can also capture the visibility level of the external environment surrounding the vehicle carrying the first device 102.

The environmental module 524 can use object detection algorithms, edge matching algorithms, gradient matching algorithms, conditional density propagation algorithms, block-based correlation algorithms, block matching algorithms, color-recognition algorithms, Hidden Markov models, or a combination thereof to discern instances of the environmental context 358 captured in the field-of-view 312 of either the front-facing unit 221 or the rear-facing unit 223. The environmental module 524 can also use the rear-facing unit 223 to capture the image sequence 324 of the environmental context 358.

For example, the rear-facing unit 223 can capture the contour of the taillight of the vehicle immediately ahead of the vehicle carrying the first device 102. The image sequence 324 can show the contour increasing in size at a rapid rate. The environmental module 524 can interpret this increase in size of the contour images as the vehicle immediately ahead braking suddenly. In this instance, if the front-facing unit 221 of the navigation system 100 also captures the user 304 making an instance of the gesture 302 along with the user 304 repeating the word "traffic," the environmental module 524 can determine the gesticulate emotion 302 as an instance of the command motion 308 for displaying traffic information on the first display interface 230.

As an additional example, the navigation system 100 can capture the user 304 making an instance of the gesture 302 involving the open palm of the user 304 directed along the lateral axis 320 in a rightward direction from the perspective of the image capture unit 219. The navigation system 100 can also detect the user 304 saying the word "unmute" or "volume up" in connection with the gesture 302. If the rear-facing unit 223 also detects the visibility of the user 304 as bad due to heavy fog, the environmental module 524 can determine the gesture 302 as an instance of the command motion 308 to unmute an audible navigation instruction.

In addition, the context module 516 is also configured to interact with the blacklist module 510 to add instances of the gesture 302 to the motion blacklist 364 and words or phrases to the auditory blacklist 366 based on the contextual information 350. For example, the locational module 518 can detect a sudden deceleration of the first device 102 and the environmental module 524 can detect the taillight of the vehicle immediately ahead of the vehicle carrying the first device 102 as increasing in size at a rapid rate. In this instance, the context module 516 can interact with the blacklist module 510 to ignore all instances of the gesture 302 and the auditory cue 336 from being recognized by the navigation system 100 because the user 304 might be gesturing to brace for an impact with the vehicle immediately ahead.

As an additional example, the context module 516 can interact with the locational module 518 and detect that the vehicle carrying the first device 102 is stationary and the vehicle has not been mobile in the last 30 minutes. In this instance, the context module 516 can instruct the blacklist module 510 to add any instance of the command motion 308 previously associated with a command to unlock the first device 102. By doing so, the context module 516 can force the user 304 to have to manually enter or apply a security code, pin, or touch gesture to unlock the first device 102 as a security precaution.

The context module 516 can be part of the first software 226, the second software 242, or a combination thereof. The first control unit 212 can execute the first software 226, the second control unit 234 can execute the second software 242, or a combination thereof to determine the contextual information 350 and distinguish between the natural motion 310 and the command motion 308.

The context module 516 can also communicate the contextual information 350 between devices through the first communication unit 216, the second communication unit 236, or a combination thereof. After generating the contextual information 350, the control flow can pass from the context module 516 to the combination module 526.

The combination module 526 is configured to generate the command combination 368 of FIG. 3 for instructing the navigation system 100 based on the command motion 308 and the auditory cue 336. In addition, the combination module 526 is configured to identify exemplary instances of the command motion 308 and the auditory cue 336 for generating the mute command 370, the navigation command 378, the display command 416, the unlock command 410, the affirmative command 402, or a combination thereof.

The combination module 526 can generate the command combination 368 by analyzing the auditory cue 336 and associating the auditory cue 336 with the command motion 308. The combination module 526 can analyze the auditory cue 336 by determining the application instructions, device instructions, system events, or a combination thereof required to carry out words or phrases included as part of the auditory cue 336.

For example, the combination module 526 can search through event calls, operating system (OS) calls, function calls, application calls, routines, subroutines, executable files, or a combination thereof to determine a match between words or phrases included as part of the auditory cue 336 and the name or identifier of the event calls, the OS calls, the function calls, the application calls, the routines, the subroutines, the executable files, or a combination thereof.

As an additional example, the combination module 526 can also interact with the auditory module 504 to extract synonyms of the auditory cue 336 when words or phrases in the auditory cue 336 are not contained in any instances of the event calls, the OS calls, the function calls, the application calls, the routines, the subroutines, the executable files, or a combination thereof. By doing so, the combination module 526 can perform a new search of such calls, routines, and functions using more common synonyms of words or phrases included in the auditory cue 336.

When the combination module 526 has identified the instructions, calls, events, or files required to carry out the words or phrases included as part of the auditory cue 336, the combination module 526 can associate the command motion 308 with the auditory cue 336 and associate the command motion 308 with the application instructions, device instructions, system events, or a combination thereof required to carry out the auditory cue 336. In addition, the combination module 526 can store the command combination 368 including the command motion 308 and the auditory cue 336 associated with the command motion 308 in the first storage unit 214, the second storage unit 246, or a combination thereof. Once the command combination 368 has been stored, the combination module 526 can identify a recurring instance of the command motion 308 without the auditory cue 336 accompanying the command motion 308.

The combination module 526 is also configured to identify exemplary instances of the command motion 308 and the auditory cue 336. The combination module 526 can then generate instances of the command combination 368 based on the command motion 308 and the auditory cue 336.

For example, the combination module 526 can interact with the gesture module 502 to identify the mute gesture 374 as the hand of the user 304 raised in an open palm configuration with the palm of the hand facing toward the image capture unit 219. In addition, the combination module 526 can interact with the gesture module 502 to identify the motion trajectory 314 of the mute gesture 374 directed along the lateral axis 320 in a leftward direction from the perspective of the image capture unit 219.

The combination module 526 can also interact with the auditory module 504 to identify the mute cue 376 of FIG. 3 as a verbalized instance of the word "mute" or a synonym of the word "mute" such as "quiet," "silent," hush," or a combination thereof. The combination module 526 can generate the mute command 370 of FIG. 3 when the mute gesture 374 and the mute cue 376 are identified.

The mute command 370 can involve one or more other modules of the navigation system 100 undertaking or invoking calls, routines, or executable files to silence or turn off the sound of audible instructions provided by a device in the navigation system 100 such as the first device 102. For example, the combination module 526 can turn off the sound of the audio instruction 372 as part of the mute command 370.

As an additional example, the combination module 526 can interact with the gesture module 502 to identify the affirmative gesture 406 of FIG. 4 as the hand of the user 304 in a thumbs-up configuration. The combination module 526 can also interact with the gesture module 502 to identify the motion trajectory 314 of the affirmative gesture 406 directed along the depth axis 318 toward the image capture unit 219.

The combination module 526 can interact with the auditory module 504 to identify the affirmative cue 408 of FIG. 4 as a verbalized instance of the word "yes" or a synonym of the word "yes," such as "yeah," ya," "okay," "kay," or a combination thereof. The combination module 526 can generate the affirmative command 402 of FIG. 4 when the affirmative gesture 406 and the affirmative cue 408 are identified.

The affirmative command 402 can involve one or more other modules of the navigation system 100 undertaking or invoking calls, routines, or executable files to indicate agreement in response to the question prompt 404. For example, the combination module 526 can display all gas stations along the navigation route 380 in response to receiving the affirmative command 402 to the question prompt 404 containing the message, "Show Gas Stations?"

Also, for example, the combination module 526 can interact with the gesture module 502 to identify the unlock gesture 412 of FIG. 4 as the hand of the user 304 formed in a U-shape. In addition, the combination module 526 can interact with the gesture module 502 to identify the motion trajectory 314 of the unlock gesture 412 directed along the depth axis 318 toward the image capture unit 219.

The combination module 526 can also interact with the auditory module 504 to identify the unlock cue 414 of FIG. 4 as a verbalized instance of the word "unlock" or a synonym of the word "unlock" such as "open," "unlatch," "release" or a combination thereof. The combination module 526 can generate the unlock command 410 of FIG. 4 when the unlock gesture 412 and the unlock cue 414 are identified.

The unlock command 410 can involve the combination module 526 interacting with one or more other modules or units of the navigation system 100 such as the first control unit 212, the first control interface 222, the first user interface 218, or a combination thereof to unlock a display of a device in the navigation system 100 such as the first display interface 230.

Also, for example, the combination module 526 can interact with the gesture module 502 to identify the navigation gesture 386 of FIG. 3 as the hand of the user 304 formed in an O-shape with the thumb of the hand making contact with the tip of the index finger and the pinky of the hand facing the image capture unit 219. The combination module 526 can also interact with the gesture module 502 to identify the motion trajectory 314 of the navigation gesture 386 directed along the depth axis 318 toward the image capture unit 219.

The combination module 526 can also interact with the auditory module 504 to identify the navigation cue 388 of FIG. 3 as a verbalized instance of the destination 382 desired by the user 304. As a more specific example, the navigation cue 388 can be a verbalized instance of the word "home" when the user 304 desires the destination to be the residence of the user 304. The navigation cue 388 can also include synonyms of the word "home," such as "house," "condo," or "apartment."

The combination module 526 can generate the navigation command 378 of FIG. 3 when the navigation gesture 386 and the navigation cue 388 are identified. The navigation command 378 can involve one or more other modules of the navigation system 100 undertaking or invoking calls, routines, or executable files to generate the navigation route 380 to the destination 382 indicated by the navigation cue 388.

The navigation route 380 can be generated through a navigation application on a device in the navigation system 100 such as the first device 102, the second device 106, or a combination thereof. In addition, the combination module 526 can interact with the context module 516 to analyze the locational context 352, the user-specific context 356, or a combination thereof for determining the geographic location or coordinate position associated with words or phrases included as part of the navigation cue 388. As a more specific example, the combination module 526 can interact with the user-specific module 522 to determine the geographic location of the destination 382.

As yet another example, the combination module 526 can interact with the gesture module 502 to identify the page view gesture 420 of FIG. 4 as the hand of the user 304 raised in an open palm configuration with the palm of the hand facing the image capture unit 219. The combination module 526 can also interact with the gesture module 502 to identify the motion trajectory 314 of the page view gesture 420 directed along the vertical axis 322 in an upward direction from the perspective of the image capture unit 219.

The combination module 526 can also interact with the auditory module 504 to identify the page invocation cue 422 of FIG. 4 as a verbalized instance of the graphic page 418 desired by the user 304. As a more specific example, the page invocation cue 422 can include the verbalized instance of the word "route" to instruct a display such as the first display interface 230 to display an instance of the graphic page 418 having a route summary. The page invocation cue 422 can also include words or phrases of other instances of the graphic page 418 such as "list" for a list page, "steps" for a step-by-step instruction page, or a combination thereof.

The combination module 526 can generate the display command 416 of FIG. 4 when the page view gesture 420 and the page invocation cue 422 are identified. The display command 416 can involve one or more other modules of the navigation system 100 undertaking or invoking calls, routines, or executable files to reveal an instance of the graphic page 418 associated with the page invocation cue 422.

The combination module 526 can be part of the first software 226, the second software 242, or a combination thereof. The first control unit 212 can execute the first software 226, the second control unit 234 can execute the second software 242, or a combination thereof to generate the command combination 368 and recognize exemplary instances of the command combination 368 such as the mute command 370, the affirmative command 402, the navigation command 378, the unlock command 410, the display command 416, or a combination thereof.

The combination module 526 can also communicate the command combination 368 between devices through the first communication unit 216, the second communication unit 236, or a combination thereof.

It has been discovered that generating the command combination 368 based on the command motion 308 and the auditory cue 336 encourages safe driving behavior by the user 304. Since the navigation system 100 can receive inputs from the user 304 without the user 304 having to physically touch a display such as the first display interface 230, the navigation system 100 does not distract the user 304 in situations where the user 304 is operating a vehicle while engaging with the navigation system 100.

It has been discovered that distinguishing between the command motion 308 and the natural motion 310 based on the synchronicity 348 of the timing 349 of the gesture 302 and the auditory cue 336 provides for a more accurate determination of the command motion 308. By using the synchronicity 348 of the gesture 302 and the auditory cue 336 as a way to differentiate between the command motion 308 and the natural motion 310, the navigation system 100 can more accurately identify the command motion 308 and the auditory cue 336 and take advantage of the human tendency to accompany speech with hand motions.

It has been discovered that using the synonym cluster 346 to determine or reaffirm a meaning for one or more words or phrases of the auditory cue 336 improves the usability of the navigation system 100 by increasing the number of words or phrases that can possibly serve as the auditory cue 336. Searching the synonym cluster 346 for similar words or phrases that are more widely recognized or used in speech reduces the likelihood that a seldom used word or phrase would not be recognized as the auditory cue 336. In addition, the synonym cluster 346 allows the navigation system 100 to more easily search for calls, routines, or executable files needed to implement commands intended by seldom used words or phrases of the auditory cue 336. In this instance, the navigation system 100 can use the synonym cluster 346 to substitute more common words or phrases for the seldom used words or phrases.

It has been discovered that generating the motion blacklist 364 and the auditory blacklist 366 provides for improved resource efficiency since the navigation system 100 does not need to determine whether an instance of the gesture 302 or the auditory signal 334 is the command motion 308 or the auditory cue 336, respectively, if the gesture 302 and the words or phrases of the auditory signal 334 are included in the motion blacklist 364, the auditory blacklist 366, or a combination thereof. Both the motion blacklist 364 and the auditory blacklist 366 can also be continuously populated with new motions and words based on the ongoing interactions between the user 304 and the navigation system 100.

It has been discovered that analyzing the locational context 352 when determining the command motion 308 provides for a more accurate interpretation of the gesture 302. The navigation system 100 can quickly rule out certain motions based on the present speed, heading 362, acceleration, and the current location 360 of the device being tracked by the a navigation system 100 such as the first device 102. The navigation system 100 can also more efficiently and accurately determine instances of the command combination 368 related to navigation functions.

It has been discovered that analyzing the user-specific context 356 when determining the command motion 308 provides for an improved user experience. By analyzing the historical behavior of the user 304 including past device and application usage by the user 304, the navigation system 100 can more accurately and effectively generate the command combination 368 desired by the user 304 based on past interactions between the user 304 and the navigation system 100. The navigation system 100 can also more easily identify the gesture 302 or words made by the user 304 by taking into account certain traits of the user 304 such as vocal inflections, hand shapes, or a combination thereof.

The modules in FIG. 5 can be implemented by hardware acceleration units (not shown) in the control units. The modules in FIG. 1 can also be implemented by separate hardware units (not shown) outside the control units but with the first device 102 or the second device 106.

The modules described in this application can be implemented as instructions stored on a non-transitory computer readable medium to be executed by the first control unit 212, the second control unit 234, or a combination thereof. The non-transitory computer medium can include the first storage unit 214, the second storage unit 246, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 6:
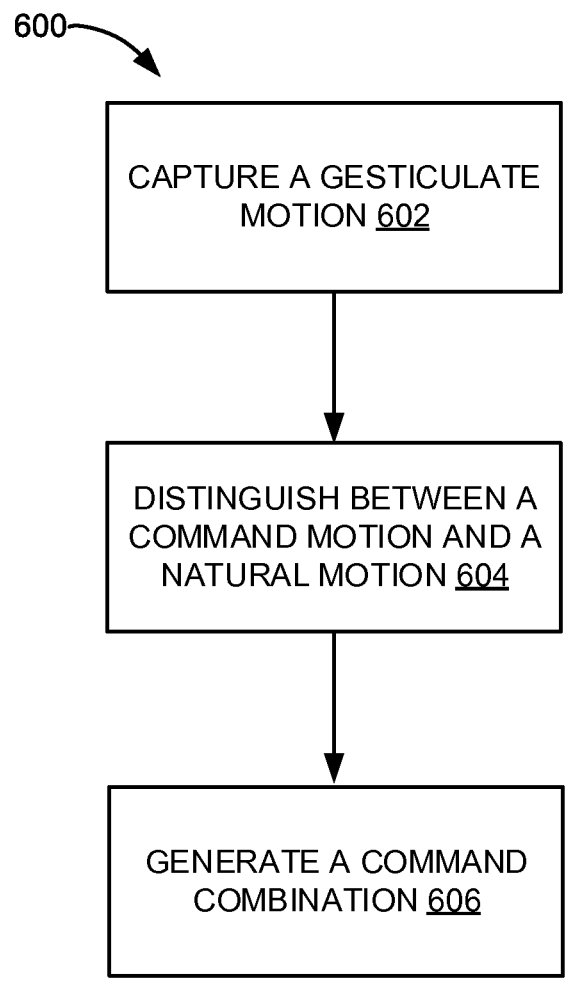
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: capturing, with the image capture unit 219, the gesture 302 in a block 602; distinguishing, with the control unit 212 coupled to the image capture unit 219, between the command motion 308 and the natural motion 310 based on the gesture 302, the auditory cue 336, and the contextual information 350 in a block 604; and generating the command combination 368 for instructing the navigation system 100 based on the command motion 308 and the auditory cue 336 in a block 606.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A navigation system comprising:
    an image capture unit, configured to capture a gesture;
    a control unit, coupled to the image capture unit, configured to:
        distinguish between a command motion and a natural motion based on the gesture, an auditory cue, and a contextual information; and
        generate a command combination for instructing the navigation system based on the command motion and the auditory cue.

2. The system as claimed in claim 1 wherein the control unit is configured to distinguish between the command motion and the natural motion based on a synchronicity of a timing of the gesture and the auditory cue.

3. The system as claimed in claim 1 wherein the control unit is configured to:
  identify an auditory signal; and
  determine the auditory cue based on the auditory signal, a synonym cluster, and the contextual information.

4. The system as claimed in claim 1 wherein the control unit is configured to generate a motion blacklist for determining the natural motion based on a motion trajectory, the auditory cue, the contextual information, or a combination thereof.

5. The system as claimed in claim 1 wherein the control unit is configured to generate an auditory blacklist for determining the auditory cue based on a speech pattern, the gesture, the contextual information, or a combination thereof.

6. The system as claimed in claim 1 wherein the control unit is configured to:
  capture a base image for representing a gesture contour of the gesture;
  capture a further image for representing the gesture contour of the gesture; and
  determine a motion trajectory based on the base image and the further image.

7. The system as claimed in claim 1 wherein the control unit is configured to:
  identify a navigation gesture for generating a navigation route to a destination;
  identify a navigation cue; and
  generate a navigation command based on the navigation gesture, the navigation cue, the contextual information, or a combination thereof.

8. The system as claimed in claim 1 wherein the control unit is configured to:
  identify a page view gesture for arranging a display interface;
  identify a page invocation cue;
  generate a display command for displaying a graphic page on the display interface based on the page view gesture, the page invocation cue, the contextual information, or a combination thereof.

9. The system as claimed in claim 1 wherein the control unit is configured to:
  identify an unlock gesture for unlocking the device;
  identify an unlock cue; and
  generate an unlocked instance of a device based on the unlock gesture, the unlock cue, the contextual information, or a combination thereof.

10. The system as claimed in claim 1 wherein the control unit is configured to:
  identify an affirmative gesture for responding to a question prompt;
  identify an affirmative cue; and
  generate an affirmative command based on the affirmative gesture, the affirmative cue, the contextual information, or a combination thereof.

11. A method of operation of a navigation system comprising:
  capturing, with an image capture unit, a gesture;
  distinguishing, with a control unit coupled to the image capture unit, between a command motion and a natural motion based on the gesture, an auditory cue, and a contextual information; and
  generating a command combination for instructing the navigation system based on the command motion and the auditory cue.

12. The method as claimed in claim 11 further comprising distinguishing between the command motion and the natural motion based on a synchronicity of a timing of the gesture and the auditory cue.

13. The method as claimed in claim 11 further comprising:
  identifying an auditory signal; and
  determining the auditory cue based on the auditory signal, a synonym cluster, and the contextual information.

14. The method as claimed in claim 11 further comprising generating a motion blacklist for determining the natural motion based on a motion trajectory, the auditory cue, the contextual information, or a combination thereof.

15. The method as claimed in claim 11 further comprising generating an auditory blacklist for determining the auditory cue based on a speech pattern, the gesture, the contextual information, or a combination thereof.

16. A non-transitory computer readable medium, including instructions for execution, comprising:
  capturing a gesture;
  distinguishing between a command motion and a natural motion based on the gesture, an auditory cue, and a contextual information; and
  generating a command combination for instructing the navigation system based on the command motion and the auditory cue.

17. The non-transitory computer readable medium as claimed in claim 16 further comprising distinguishing between the command motion and the natural motion based on a synchronicity of a timing of the gesture and the auditory cue.

18. The non-transitory computer readable medium as claimed in claim 16 further comprising:
  identifying an auditory signal; and
  determining the auditory cue based on the auditory signal, a synonym cluster, and the contextual information.

19. The non-transitory computer readable medium as claimed in claim 16 further comprising generating a motion blacklist for determining the natural motion based on a motion trajectory, the auditory cue, the contextual information, or a combination thereof.

20. The non-transitory computer readable medium as claimed in claim 16 further comprising generating an auditory blacklist for determining the auditory cue based on a speech pattern, the gesture, the contextual information, or a combination thereof.

* * * * *